(12) United States Patent
Khoryaev et al.

(10) Patent No.: US 11,533,695 B2
(45) Date of Patent: Dec. 20, 2022

(54) SYNCHRONIZATION FOR SIDELINK BASED ON PRIORITIZATION OF SYNCHRONIZATION SIGNALS

(71) Applicant: Apple Inc., Cupertino, CA (US)

(72) Inventors: Alexey Khoryaev, Nizhny Novgorod (RU); Jerome Parron, Fuerth (DE); Mikhail Shilov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/259,126

(22) PCT Filed: Aug. 8, 2019

(86) PCT No.: PCT/US2019/045797
§ 371 (c)(1),
(2) Date: Jan. 8, 2021

(87) PCT Pub. No.: WO2020/033759
PCT Pub. Date: Feb. 13, 2020

(65) Prior Publication Data
US 2021/0176723 A1  Jun. 10, 2021

Related U.S. Application Data

(60) Provisional application No. 62/717,672, filed on Aug. 10, 2018.

(51) Int. Cl.
*H04W 56/00* (2009.01)
*H04B 17/318* (2015.01)
(Continued)

(52) U.S. Cl.
CPC ...... *H04W 56/0015* (2013.01); *H04B 17/318* (2015.01); *H04W 4/40* (2018.02); *H04W 24/10* (2013.01); *H04W 72/005* (2013.01)

(58) Field of Classification Search
CPC ... H04W 56/0015; H04W 4/40; H04W 24/10; H04W 72/005; H04W 84/047; H04W 88/04; H04B 17/318
See application file for complete search history.

(56) References Cited

U.S. PATENT DOCUMENTS

2017/0086158 A1    3/2017  Feng et al.
2019/0098589 A1*   3/2019  Chae ................ H04W 56/0015
(Continued)

FOREIGN PATENT DOCUMENTS

EP    3340699 A1    6/2018
WO    2016108456    7/2016
WO    2017213420    12/2017

OTHER PUBLICATIONS

Examination Report; Great Britain Application No. GB2100508.7; dated Nov. 29, 2021; 4 pgs.
(Continued)

*Primary Examiner* — Hassan Kizou
*Assistant Examiner* — Abdullahi Ahmed
(74) *Attorney, Agent, or Firm* — Kowert, Hood, Munyon, Rankin & Goetzel, P.C.

(57) ABSTRACT

Embodiments of a User Equipment (UE) and methods of communication are generally described herein. The UE may attempt to detect synchronization signals, including Long Term Evolution (LTE) synchronization signals from eNBs, New Radio (NR) synchronization signals from gNBs, and sidelink synchronization signals (SLSSs) from other UEs. The UE may prioritize an LTE synchronization signal over an SLSS, and may prioritize an NR synchronization signal over an SLSS. If the UE does not detect an LTE synchronization signal or an NR synchronization signal, the UE may select an SLSS. The UE may prioritize an SLSS from a UE that is directly synchronized to an eNB or a gNB over an
(Continued)

SLSS from another UE that is indirectly synchronized to an eNB or a gNB.

20 Claims, 4 Drawing Sheets

(51) Int. Cl.
*H04W 4/40* (2018.01)
*H04W 24/10* (2009.01)
*H04W 72/00* (2009.01)

(56) References Cited

U.S. PATENT DOCUMENTS

| | | | |
|---|---|---|---|
| 2020/0045660 A1* | 2/2020 | Lee | H04W 72/0406 |
| 2020/0196255 A1* | 6/2020 | Cheng | H04W 72/10 |
| 2020/0245272 A1* | 7/2020 | Hong | H04W 4/40 |
| 2021/0185628 A1* | 6/2021 | Huang | H04W 56/0015 |
| 2021/0360520 A1* | 11/2021 | Chen | H04L 5/0048 |
| 2022/0053439 A1* | 2/2022 | Hu | H04W 56/0015 |

OTHER PUBLICATIONS

Intel Corporation, 'Remaining sidelink synchronization details for LTE V2V 1-20 carrier', RI-1806482, 3GPP TSG RAN WGI Meeting #93, Busan, Korea, May 12, 2018 See pp. 2-4.

LG Electronics, 'Remaining issues on synchronization for sidelink CA', 1-20 RI-1806582, 3GPP TSG RAN WGI Meeting #93, Busan, Korea, May 12, 2018 See pp. 1-2.

ITRI, 'Remaining issues on synchronization for sidelink carrier aggregation 1-20 in V2X phase 2', RI-1806817, 3GPP TSG RAN WGI Meeting #93, Busan, Korea, May 11, 2018 See pp. 1-5.

International Search Report and Written Opinion for International Application No. PCT/US2019/045797, dated Nov. 21, 2019, pp. 1-9.

* cited by examiner

SYNCHRONIZATION FOR SIDELINK BASED ON PRIORITIZATION OF SYNCHRONIZATION SIGNALS

PRIORITY CLAIM

This application claims priority to U.S. Provisional Patent Application Ser. No. 62/717,672, filed Aug. 10, 2018, which is incorporated herein by reference in its entirety.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to sidelink communication, vehicle-to-vehicle (V2V) communication and/or vehicle-to-everything (V2X) communication. Some embodiments relate to methods of synchronization for sidelink communication based on prioritization of synchronization signals from networks and mobile devices.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
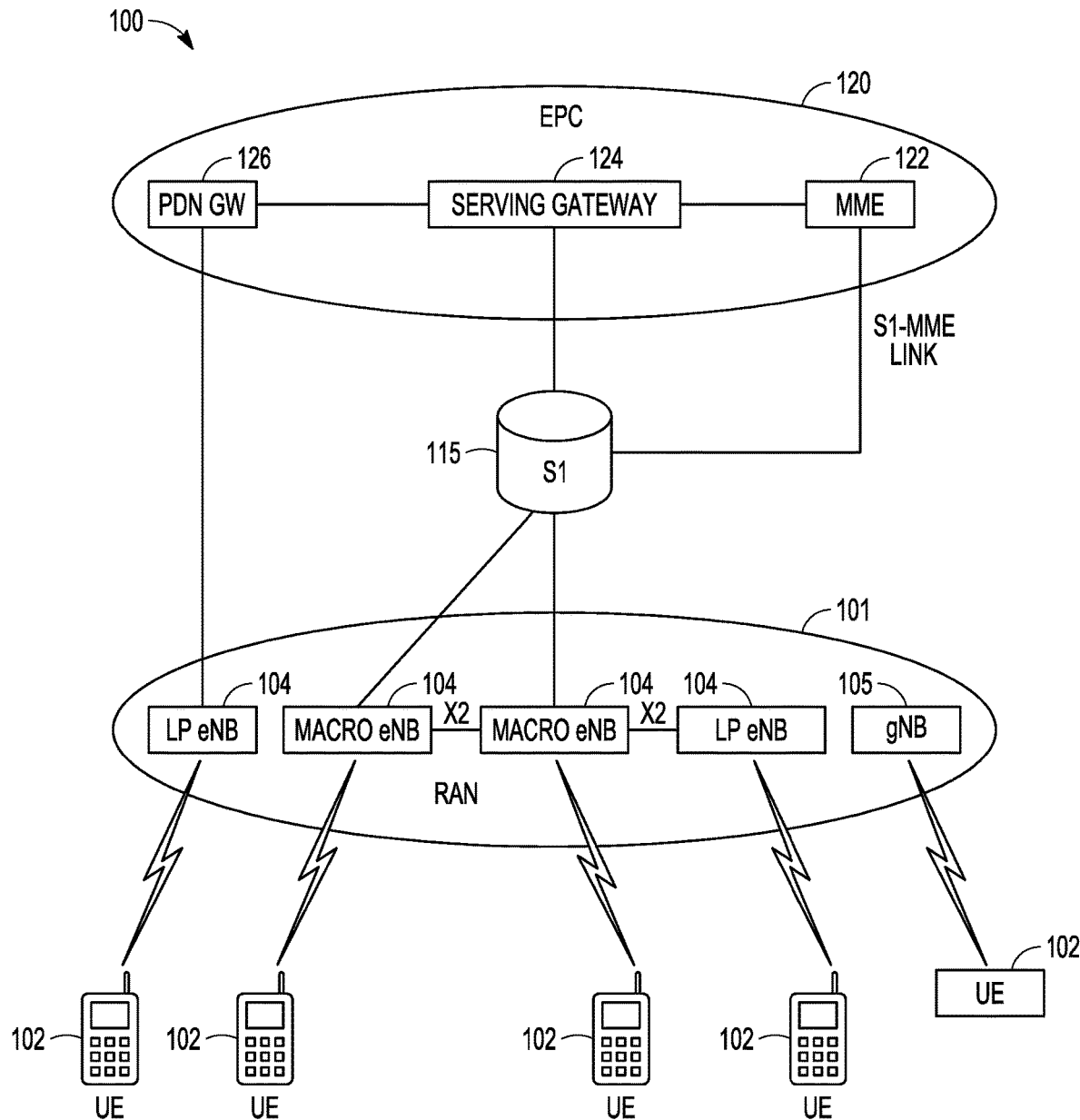
FIG. 1A is a functional diagram of an example network in accordance with some embodiments.
Figure 1B:
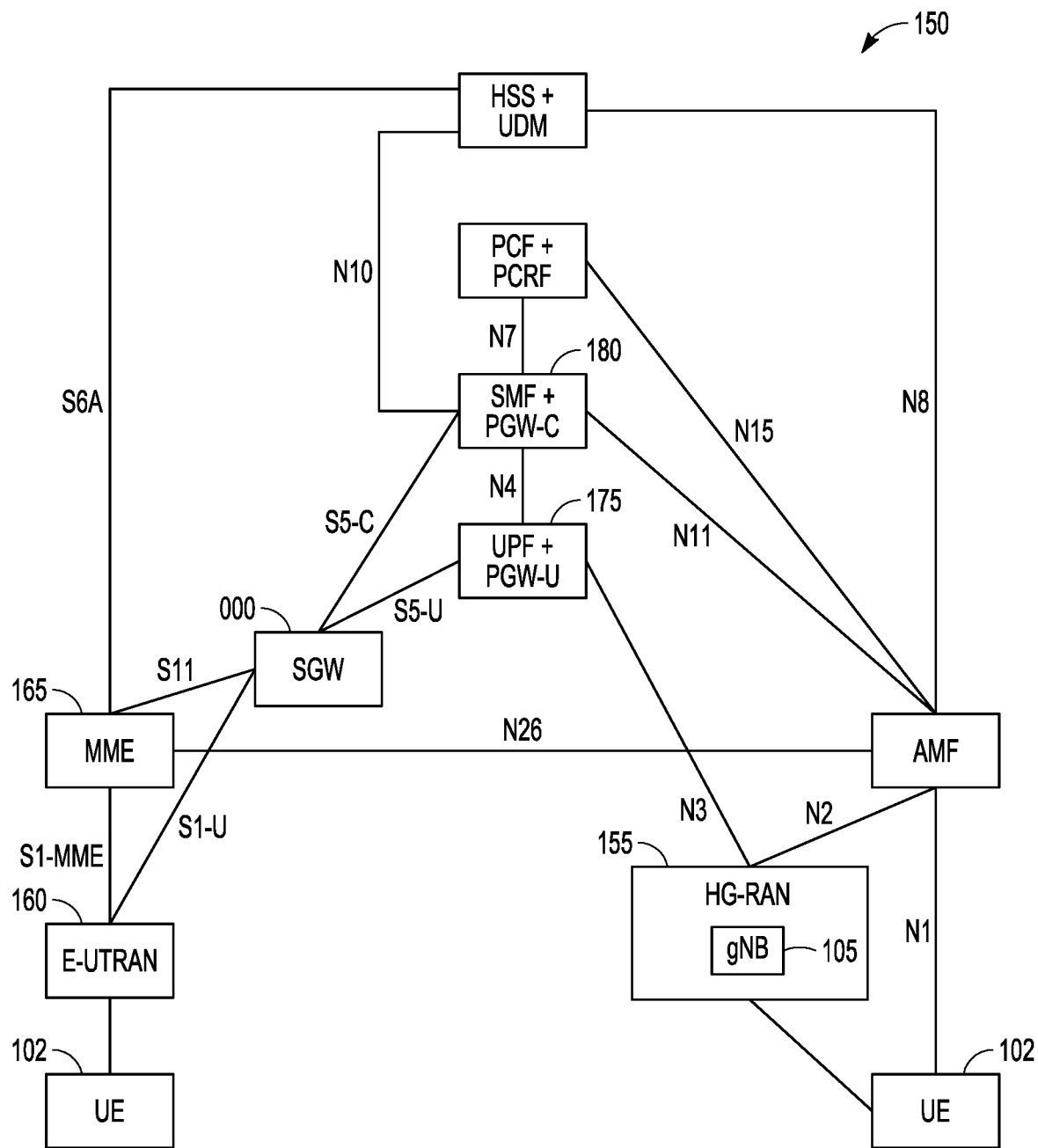
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
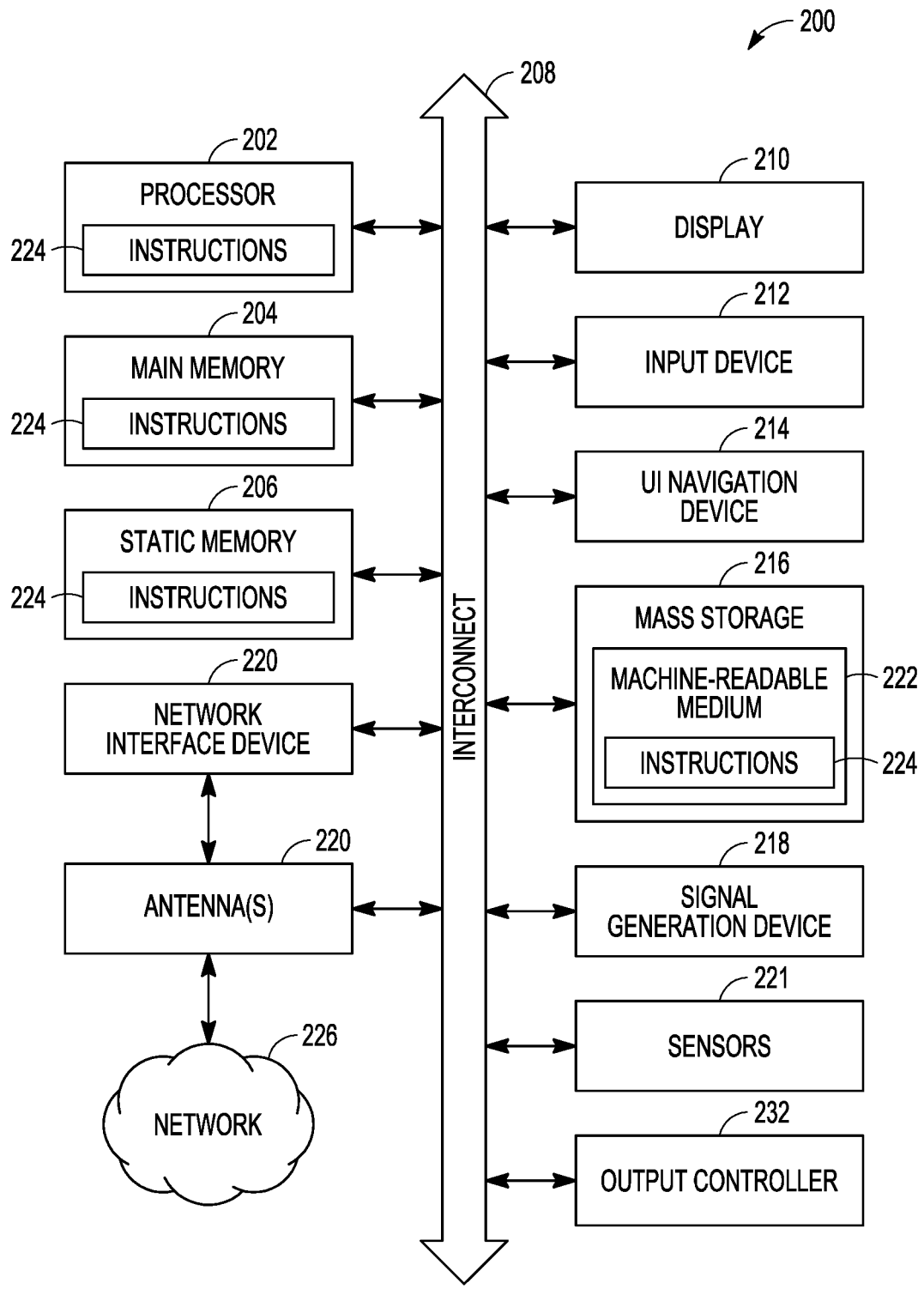
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
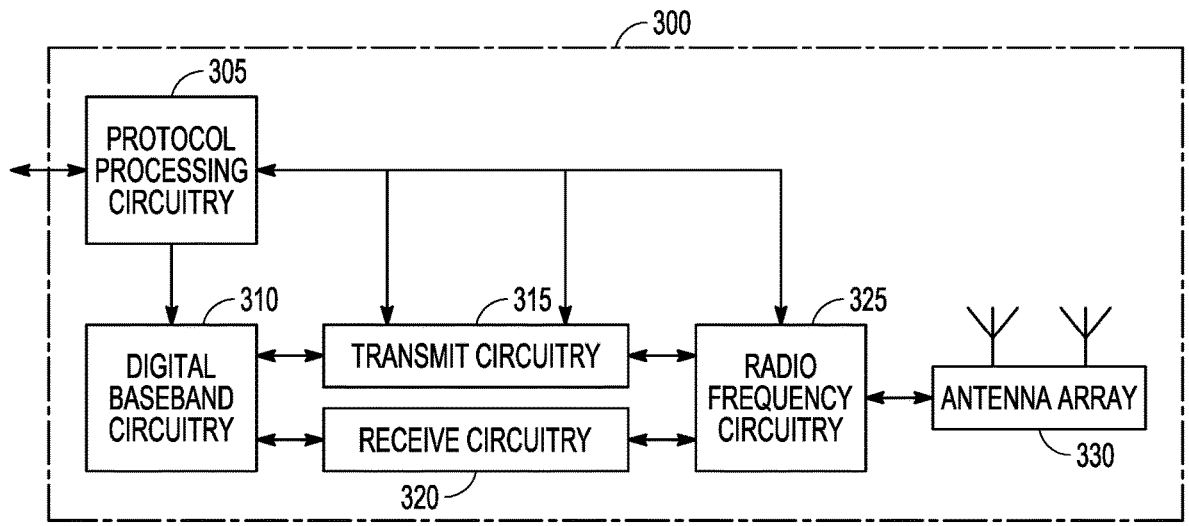
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, the UE 102 may attempt to detect synchronization signals, including Long Term Evolution (LTE) synchronization signals from eNBs 104, New Radio (NR) synchronization signals from gNBs 105, and sidelink synchronization signals (SLSSs) from other UEs 102. If the UE 102 detects two or more synchronization signals, the UE 102 may select one of the detected synchronization signals for usage in determination of a reference timing for sidelink transmissions by the UE 102. If the UE 102 detects an LTE synchronization signal and an SLSS, the UE 102 may select the LTE synchronization signal. If the UE 102 detects an NR synchronization signal and an SLSS, the UE 102 may select the NR synchronization signal. If the UE 102 does not detect an LTE synchronization signal or an NR synchronization signal, and if the UE 102 detects two or more SLSSs the UE 102 may select one of the detected SLSSs based on a selection criterion. In some embodiments an SLSS from a UE 102 that is directly synchronized to an eNB 104 or a gNB 105 is selected over an SLSS from another UE that is indirectly synchronized to an eNB 104 or a gNB 105. These embodiments are described in more detail below.

Figure 4:
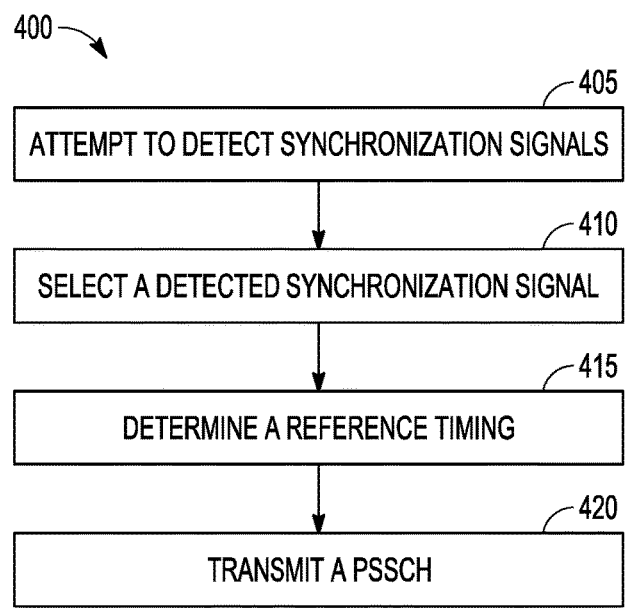
FIG. 4 illustrates the operation of a method of communication in accordance with some embodiments.

FIG. 4 illustrates the operation of a method of communication in accordance with some embodiments. Embodiments of the method 400 may include additional or even fewer operations or processes in comparison to what is illustrated in FIG. 4. Embodiments of the method 400 are not necessarily limited to the chronological order that is shown in FIG. 4.

In some embodiments, a UE 102 may perform one or more operations of the method 400, but embodiments are not limited to performance of the method 400 and/or operations of it by the UE 102. In some embodiments, a device and/or component (including but not limited to the UE 102, gNB 105 and/or eNB 104) may perform one or more operations that may be the same as, similar to, reciprocal to and/or related to an operation of the method 400.

Discussion of various operations, techniques and/or concepts regarding one method described herein (such the method 400 and/or other) may be applicable to another method described herein (such as the method 400 and/or other). One or more of the techniques, operations and/or methods described herein may be performed by a device other than an eNB 104, gNB 105, and UE 102, including but not limited to a Wi-Fi access point (AP), station (STA) and/or other.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of the method 400 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

At operation 405, the UE 102 may attempt to detect synchronization signals. At operation 410, the UE 102 may select a synchronization signal. At operation 415, the UE 102 may determine a reference timing. At operation 420, the UE 102 may transmit a physical sidelink shared channel (PSSCH) or other sidelink signals/channels, including but not limited to a physical sidelink control channel (PSCCH), physical sidelink feedback channel (PSFSH), and/or sidelink synchronization signals (SLSSs).

In some embodiments, the UE 102 may attempt to detect one or more synchronization signals. The synchronization signals may include one or more of: Long Term Evolution (LTE) synchronization signals from eNBs 104, New Radio (NR) synchronization signals from gNBs 105, sidelink synchronization signals (SLSSs) from other UEs 102, and/or other.

In some embodiments, if the UE 102 detects two or more synchronization signals, the UE 102 may select one of the detected synchronization signals. The UE 102 may select the detected synchronization signal for usage in determination of a reference timing for sidelink transmissions by the UE 102, although the scope of embodiments is not limited in this respect. In some embodiments, the UE 102 may select the detected synchronization signal for usage other purposes (in addition to or instead of determination of the reference timing for sidelink transmissions by the UE 102).

In some embodiments, if the UE 102 detects an LTE synchronization signal and an SLSS, the UE 102 may select the LTE synchronization signal. In some embodiments, if the UE 102 detects an NR synchronization signal and an SLSS, the UE 102 may select the NR synchronization signal. In some embodiments, if the UE 102 does not detect an LTE synchronization signal or an NR synchronization signal, and if the UE 102 detects two or more SLSSs: the UE 102 may select one of the detected SLSSs based on a selection criterion. In some embodiments, in accordance with the selection criterion, the UE 102 may select an SLSS from a UE 102 that is directly synchronized to an eNB 104 or a gNB 105 over an SLSS from another UE 102 that is indirectly synchronized to an eNB 104 or a gNB 105.

In some embodiments, if the UE 102 detects an LTE synchronization signal and an NR synchronization signal, the UE 102 may select (for usage in determination of the reference timing and/or other purpose(s)), the detected synchronization signal for which a corresponding signal quality measurement is highest. In a non-limiting example, the signal quality measurement may be a reference signal received power (RSRP). The scope of embodiments is not limited to usage of the RSRP, as other signal quality measurement(s) may be used, in some embodiments.

In some embodiments, if the UE 102 detects at least two synchronization signals, and if the detected synchronization signals are LTE synchronization signals or NR synchronization signals: the UE 102 may select (for usage in determination of the reference timing and/or other purpose(s)), the detected synchronization signal for which a corresponding signal quality measurement is highest.

In some embodiments, the UE 102 may select one of the detected synchronization signals (for usage in determination of the reference timing and/or other purpose(s)) based on a set of prioritization rules. In some embodiments, the set of prioritization rules may include one or more of the following rules. One prioritization rule may be based on types of the detected synchronization signals. In some embodiments, LTE synchronization signals and NR synchronization signals may be of equal priority, and may be of higher priority than SLSSs. Another prioritization rule may be based on synchronization hop information. In some embodiments, SLSSs from UEs 102 directly synchronized to an eNB 104 or gNB 105 may be of higher priority than SLSSs from UEs 102 that are indirectly synchronized to an eNB 104 or gNB 105. Another prioritization rule may be based on stationarity. In some embodiments, SLSSs from stationary UEs 102 may be of higher priority than SLSSs from non-stationary UEs 102. A tie-breaking rule may be based on corresponding signal quality measurements. For instance, if RSRP is used, a signal with a higher RSRP may be selected over another signal with a lower RSRP.

In some embodiments, the UE 102 may detect SLSSs from: non-stationary UEs 102, stationary UEs 102 and/or other. In some embodiments, the UE 102 may detect SLSSs from road side units (RSUs). An RSU may be considered a stationary UE 102 in some embodiments, although the scope of embodiments is not limited in this respect.

In some embodiments, if the UE 102 does not detect an LTE synchronization signal or an NR synchronization signal, and if the UE 102 detects two SLSSs, and if synchronization hop information of both SLSSs is the same: if one of the detected SLSSs is received from a stationary UE 102 and the other detected SLSS is received from a non-stationary UE 102, the UE 102 may select the SLSS from the stationary UE 102 (for usage in the determination of the reference timing and/or other purpose(s)). Embodiments are not limited to usage of the selection criteria described above (related to stationary and non-stationary UEs 102) in just the above case. For instance, in other scenarios, if the UE 102 detects a first SLSS from a stationary UE 102 and a second SLSS from a non-stationary UE 102, the UE 102 may select the first SLSS based on the criterion that the first SLSS is from a stationary UE 102.

In some embodiments, if the UE 102 detects only one synchronization signal, the UE 102 may use the detected synchronization signal to determine reference timing.

In some embodiments, the UE 102 may attempt to detect global navigation satellite system (GNSS) signals. In some embodiments, the UE 102 may attempt to detect one or more of: GNSS signals, LTE synchronization signals, NR synchronization signals, SLSSs and/or other.

In some embodiments, in a GNSS-based prioritization, if the UE 102 detects a GNSS synchronization signal, the UE 102 may select the GNSS synchronization signal (for usage in determination of the reference timing and/or other purpose(s)). In some embodiments, in an eNB/gNB based prioritization, if the UE 102 does not detect an LTE synchronization signal or an NR synchronization signal, and if the UE 102 detects a GNSS synchronization signal, the UE 102 may select the GNSS synchronization signal (for usage in determination of the reference timing and/or other purpose(s)).

In some embodiments, the UE 102 may detect the LTE synchronization signals in resources allocated for LTE communication. In some embodiments, the UE 102 may detect the LTE synchronization signals in accordance with an LTE protocol. In some embodiments, the UE 102 may detect the NR synchronization signals in resources allocated for NR communication. In some embodiments, the UE 102 may detect the NR synchronization signals in accordance with an NR protocol.

In some embodiments, the UE 102 may transmit an SLSS that includes one or more of: a sidelink primary synchronization signal (S-PSS), a sidelink secondary synchronization signal (S-SSS), and a physical sidelink broadcast channel (PSBCH). In some embodiments, the UE 102 may encode the S-PSS based on a single sequence.

In some embodiments, the UE 102 may transmit an SLSS that includes one or more of: an S-PSS, an S-SSS, and a PSBCH. In some embodiments, the UE 102 may encode the S-PSS based on two sequences. In some embodiments, the UE 102 may encode the S-PSS based on one or more of: a synchronization hop count, an original synchronization source type, an in-coverage/out-of-coverage UE state, and/or other.

In some embodiments, resources for SLSS transmission may be configured in accordance with one or more of the following: a center frequency may be an arbitrary value preconfigured within a carrier; resources may be periodically allocated in time with periodicity taken from a set of periodicities, each of which is a multiple of system frame number (SFN) or hyperframe number (HFN); and/or other.

In some embodiments, the UE 102 may transmit a predetermined signal and/or known signal at the beginning of each slot of a plurality of slots in accordance with a common transmission by multiple UEs 102 occupying a same slot for sidelink communication. For instance, multiple UEs 102 that occupy the same slot for sidelink communication may transmit the same predetermined signal and/or known signal, in some embodiments. In some embodiments, the predetermined signal may be one or more of: an S-PSS, an S-SSS, and/or other.

In some embodiments, the LTE synchronization signals may include one or more of: a primary synchronization signal (PSS), a secondary synchronization signal (SSS), a physical broadcast channel (PBCH), a cell-specific reference signal (CRS), and/or other.

In some embodiments, the SLSSs may include one or more of: a sidelink primary synchronization signal (S-PSS), a sidelink secondary synchronization signal (S-SSS), a physical sidelink broadcast channel (PSBCH), and/or other.

In some embodiments, a sidelink transmission may include one or more of: a vehicle-to-vehicle (V2V) transmission, a vehicle-to-everything (V2X) transmission, an enhanced V2X (eV2X) transmission, device-to-device (D2D) transmission, and/or other.

In some embodiments, the UE 102 may attempt to detect synchronization signals, including LTE synchronization signals from eNBs 104, NR synchronization signals from gNBs 105, SLSSs from other UEs 102, and/or other. In some embodiments, if the UE 102 detects two or more synchronization signals, the UE 102 may select one of the detected synchronization signals based on one or more prioritization rules. In some embodiments, the UE 102 may use a prioritization rule based on types of the detected synchronization signals, wherein: LTE synchronization signals and NR synchronization signals are of equal priority, and are of higher priority than SLSSs. In some embodiments, the UE 102 may use another prioritization rule based on synchronization hop information, wherein: SLSSs from UEs 102 directly synchronized to an eNB 104 or gNB 105 are of higher priority than SLSSs from UEs 102 that are indirectly synchronized to an eNB 104 or gNB 105. In some embodiments, the UE 102 may use a tie-breaking rule based on corresponding signal quality measurements. In some embodiments, the UE 102 may determine a reference timing for sidelink transmissions by the UE 102. In some embodiments, the UE 102 may determine the reference timing based at least partly on the selected synchronization signal.

In some embodiments, if the UE 102 detects one synchronization signal, the UE 102 may select the detected synchronization signal. In some embodiments, if the UE 102 detects one synchronization signal, the UE 102 may determine a reference timing for sidelink transmissions by the UE 102 based on the detected synchronization signal. In some embodiments, if the UE 102 detects two or more synchronization signals, the UE 102 may select one of the detected synchronization signals based on a set of prioritization rules. In accordance with the prioritization rules, one or more of the following may be used by the UE 102: LTE synchronization signals and NR synchronization signals are of higher priority than SLSSs; an SLSS from a UE 102 that is directly synchronized to an eNB 104 or a gNB 105 is of higher priority than an SLSS from a UE 102 that is indirectly synchronized to an eNB 104 or a gNB 105; of a plurality of synchronization signals that includes one or more LTE synchronization signals and/or one or more NR synchronization signals, the synchronization signals are prioritized based on signal quality measurements (including but not limited to RSRP).

In some embodiments, if the UE 102 detects a first synchronization signal with a first RSRP, and the first synchronization signal is an LTE synchronization signal or an NR synchronization signal; and if the UE 102 detects a second synchronization signal with a second RSRP, and the second synchronization signal is an LTE synchronization signal or an NR synchronization signal; and if the first RSRP is greater than the second RSRP: the first synchronization signal may be of higher priority than the second synchronization signal. Embodiments are not limited to usage of RSRPs in the above description, as other signal quality measurement(s) may be used, in some embodiments.

In some embodiments, the UE 102 may determine the reference timing for sidelink transmissions by the UE 102 based on the selected synchronization signal. In some embodiments, the UE 102 may transmit a PSSCH (and/or other element(s)) in accordance with the determined reference timing. In some embodiments, the UE 102 may transmit the PSSCH (and/or other element(s)) over an NR PC5 interface to another UE 102.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a memory; and
   at least one processor coupled to the memory, configured to, when executing instructions stored in the memory, cause the apparatus to:
   detect at least two synchronization signals, including at least one Long Term Evolution (LTE) synchronization signal, at least one New Radio (NR) synchronization signal, at least one sidelink synchronization signal (SLSS), or any combination thereof; and
   select one of the at least two detected synchronization signals for usage in determination of a reference timing for sidelink transmissions, wherein selecting one of the at least two detected synchronization signals comprises:

if an LTE synchronization signal and an SLSS are detected, selecting the LTE synchronization signal, if an NR synchronization signal and an SLSS are detected, selecting the NR synchronization signal, and if an LTE synchronization signal or an NR synchronization signal is not detected, and if two or more SLSSs are detected, selecting one of the detected SLSSs based on a selection criterion wherein an SLSS from a user equipment (UE) that is directly synchronized to a network is selected over an SLSS from another UE that is indirectly synchronized to a network.

2. The apparatus according to claim 1, wherein the at least one processor further configured to:

determine the reference timing for sidelink transmissions based on the selected synchronization signal; and encode a physical sidelink shared channel (PSSCH), physical sidelink control channel (PSCCH), or SLSS for transmission in accordance with the determined reference timing, wherein the PSSCH, PSCCH, or SLSS are encoded for transmission over an NR PC5 interface to another UE.

3. The apparatus according to claim 1, wherein the at least one processor is further configured to:

if the at least two detected synchronization signals are LTE synchronization signals or NR synchronization signals:

select, for usage in determination of the reference timing, a synchronization signal for which a corresponding signal quality measurement is highest.

4. The apparatus according to claim 3, wherein the signal quality measurement is a reference signal received power (RSRP).

5. The apparatus according to claim 1, wherein the at least one processor is further configured to:

select one of the at least two detected synchronization signals for usage in determination of the reference timing based on a set of prioritization rules, wherein the set includes one or more of:

a first prioritization rule based on types of the at least two detected synchronization signals, wherein LTE synchronization signals and NR synchronization signals are of equal priority and are of higher priority than SLSSs;

a second prioritization rule based on synchronization hop information, wherein SLSSs from UEs directly synchronized to the network are of higher priority than SLSSs from UEs that are indirectly synchronized to the network, a third prioritization rule based on stationarity, wherein SLSSs from stationary UEs are of higher priority than SLSSs from non-stationary UEs, and a tie-breaking rule based on corresponding signal quality measurements.

6. The apparatus according to claim 1, wherein the at least one processor is further configured to:

if an LTE synchronization signal or an NR synchronization signal is not detected, and if two SLSSs are detected, wherein synchronization hop information of both SLSSs is the same:

if one of the detected SLSSs is received from a stationary UE and the other detected SLSS is received from a non-stationary UE, select the SLSS from the stationary UE for usage in the determination of the reference timing.

7. The apparatus according to claim 6, wherein the at least one processor is further configured to:

detect SLSSs from:
non-stationary UEs, and
stationary UEs, including road side units (RSUs).

8. The apparatus according to claim 1, wherein the at least one processor is further configured to:

encode, for transmission, an SLSS that includes one or more of: a sidelink primary synchronization signal (S-PSS), a sidelink secondary synchronization signal (S-SSS), and a physical sidelink broadcast channel (PSBCH), encode the S-PSS based on a single sequence.

9. The apparatus according to claim 1, wherein the at least one processor is further configured to:

encode, for transmission, an SLSS that includes one or more of: a sidelink primary synchronization signal (S-PSS), a sidelink secondary synchronization signal (S-SSS), and a physical sidelink broadcast channel (PSBCH), encode the S-PSS based on two sequences, encode the S-PSS based on one or more of: a synchronization hop count, an original synchronization source type, and an in-coverage/out-of-coverage state.

10. The apparatus according to claim 1, wherein resources for SLSS transmission are configured in accordance with one or more of:

a center frequency is an arbitrary value preconfigured within a carrier, and resources are periodically allocated in time with periodicity taken from a set of periodicities, each of which is a multiple of system frame number (SFN) or hyperframe number (HFN).

11. The apparatus according to claim 1, wherein the at least one processor is further configured to:

encode a predetermined signal for transmission at the beginning of each slot of a plurality of slots in accordance with a common transmission by multiple UEs occupying a same slot for sidelink communication, wherein the predetermined signal is in a set that includes at least a sidelink primary synchronization signal (S-PSS), and a sidelink secondary synchronization signal (S-SSS).

12. The apparatus according to claim 1, wherein: the at least one processor is configured to:

attempt to detect global navigation satellite system (GNSS) signals, in a GNSS-based prioritization, if a GNSS synchronization signal is detected, select the GNSS synchronization signal for usage in determination of the reference timing; and in a network based prioritization, if an LTE synchronization signal or an NR synchronization signal is not detected, and if a GNSS synchronization signal is detected, select the GNSS synchronization signal for usage in determination of the reference timing.

13. The apparatus according to claim 1, wherein the at least one processor is further configured to:

detect the LTE synchronization signals in resources allocated for LTE communication, wherein the LTE synchronization signals are detected in accordance with an LTE protocol; and detect the NR synchronization signals in resources allocated for NR communication, wherein the NR synchronization signals are detected in accordance with an NR protocol.

14. The apparatus according to claim 1, wherein the LTE synchronization signals include one or more of: a primary synchronization signal (PSS), a secondary synchronization signal (SSS), a physical broadcast channel (PBCH), and a cell-specific reference signal (CRS).

15. The apparatus according to claim 1, wherein the sidelink transmission include one or more of:
a vehicle-to-vehicle (V2V) transmission, a vehicle-to-everything (V2X) transmission, and an enhanced V2X (eV2X) transmission.

16. The apparatus of claim 1,
wherein the at least one processor includes a baseband processor to select one of the at least two detected synchronization signals, and
wherein the apparatus further comprises a transceiver to receive the at least two detected synchronization signals.

17. A non-transitory computer-readable storage medium that stores instructions for execution by processing circuitry of a User Equipment (UE), the instructions to configure the processing circuitry to:
detect at least two synchronization signals, including at least one Long Term Evolution (LTE) synchronization signal, at least one New Radio (NR) synchronization signal, at least one sidelink synchronization signals (SLSSs), or any combination thereof;
select one of the at least two synchronization signals based on a set of prioritization rules, comprising:
using a first prioritization rule based on types of the at least two detected synchronization signals, wherein LTE synchronization signals and NR synchronization signals are of equal priority, and are of higher priority than SLSSs;
using a second prioritization rule based on synchronization hop information, wherein: SLSSs from UEs directly synchronized to a network are of higher priority than SLSSs from UEs that are indirectly synchronized to a network, and
using a tie-breaking rule based on corresponding signal quality measurements; and
determine a reference timing for sidelink transmissions LIE based on the selected synchronization signal.

18. The non-transitory computer-readable storage medium of claim 17,
wherein the sidelink transmission include one or more of:
a vehicle-to-vehicle (V2V) transmission, a vehicle-to-everything (V2X) transmission, and an enhanced V2X (eV2X) transmission.

19. An apparatus comprising:
at least one processor, configured to cause a user equipment (UE) to:
detect at least two synchronization signals, including at least one Long Term Evolution (LTE) synchronization signal, at least one New Radio (NR) synchronization signal, and at least one sidelink synchronization signal (SLSS), or any combination thereof; and
determine a reference timing for sidelink transmissions by the UE based on the at least two synchronization signals; and
select one of the at least two synchronization signals based on a set of prioritization rules,
wherein LTE synchronization signals and NR synchronization signals are of higher priority than SLSSs;
wherein an SLSS from a UE that is directly synchronized to a network is of higher priority than an SLSS from a UE that is indirectly synchronized to a network; and
wherein, of a plurality of synchronization signals that includes one or more LTE synchronization signals and/or one or more NR synchronization signals, the synchronization signals are prioritized based on reference signal receive power (RSRP).

20. The apparatus according to claim 19,
wherein in the set of prioritization rules:
if a first synchronization signal with a first RSRP is detected, and the first synchronization signal is an LTE synchronization signal or an NR synchronization signal,
if a second synchronization signal with a second RSRP is detected, and the second synchronization signal is an LTE synchronization signal or an NR synchronization signal, and
if the first RSRP is greater than the second RSRP:
the first synchronization signal is of higher priority than the second synchronization signal.

* * * * *